Figure 1:
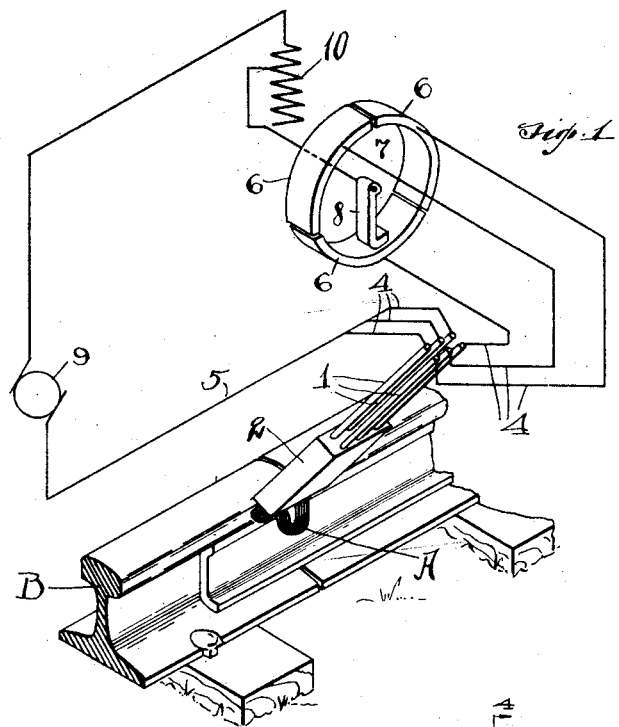

F. H. NEFF.
METHOD OF AND APPARATUS FOR ELECTRIC WELDING.
APPLICATION FILED JUNE 15, 1915.

1,209,871.

Patented Dec. 26, 1916

Witnesses
OM Kappler
Thos. H Fay.

Inventor
Frank H. Neff
By Fay, Oberlin & Fay
Attorneys

UNITED STATES PATENT OFFICE.

FRANK H. NEFF, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD OF AND APPARATUS FOR ELECTRIC WELDING.

1,209,871.  Specification of Letters Patent.  Patented Dec. 26, 1916.

Application filed June 15, 1915. Serial No. 34,166.

*To all whom it may concern:*

Be it known that I, FRANK H. NEFF, a citizen of the United States, and a resident of Cleveland, county of Cuyahoga, and State of Ohio, have invented a new and useful Improvement in Methods of and Apparatus for Electric Welding, of which the following is a specification, the principle of the invention being herein explained and the best mode in which I have contemplated applying that principle, so as to distinguish it from other inventions.

The present improvements have more particular regard to the provision of a method of and apparatus for utilizing a direct current of relatively high voltage in the welding together of metal bodies, for example 500 to 600 volts, such as is ordinarily used in the operation of street railways.

In certain general aspects the method and apparatus may be regarded as improvements in those forming the subject matter of U. S. Letters Patent No. 1,012,077, issued to Albert B. Herrick, December 19, 1911, and as in such patented case, the present improvements are especially adapted for welding copper bonds to steel rails in the operation of "bonding" rails, as is necessary in order to adapt street rails for use as a conductor for the return circuit, although the invention is not to be understood as limited to this particular field of use. In such patented process, or method, an electrode of carbon or other high resistance material is designed to be pressed against the bond terminal or an equivalent article, the contacting face of the rail or other equivalent body being heated by conduction through the first, whereby such first body and the contacting face of the other are brought to a welding temperature practically simultaneously. A current of low voltage and large amperage is required to heat an electrode of the necessary size and area for use in such process, and the current, such as the one described above as being ordinarily available, has accordingly to be converted and stepped down, in order to render it available for use in the bonding operation.

The present improved apparatus instead of comprising a single large electrode, as in the case referred to, comprises a plurality of contacting surfaces or arcing points to which the high voltage pressure is successively momentarily applied, the effect being that this momentary application at frequent intervals causes the energy to spread to adjacent surfaces forming a high temperature area which can be utilized in welding surfaces of the kind in hand, without destruction of the essential characteristics of the materials being welded.

In certain of its aspects, the present improved method and apparatus may be regarded also as an improvement or a modification of the method and apparatus shown and described in the copending application of Albert B. Herrick, filed November 29, 1912, Serial No. 733,975, the principal modification involved being the arrangement of the plural electrodes just referred to, so that the current is passed in series through successive pairs thereof and the interposed body, instead of being passed from a single such electrode through the body to the rail, as described in said copending application.

The present improved steps and means will accordingly now be described and particularly pointed out in the claims.

The annexed drawing and the following description set forth in detail certain steps and mechanism embodying the invention, such disclosed means constituting, however, but one of the various mechanical ways in which the principle of the invention may be used.

Figure 2:
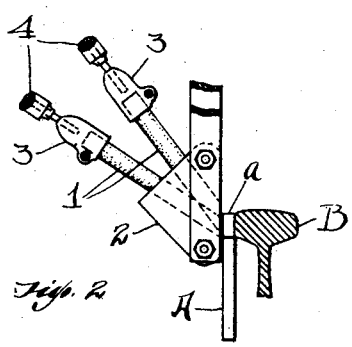
Figure 3:
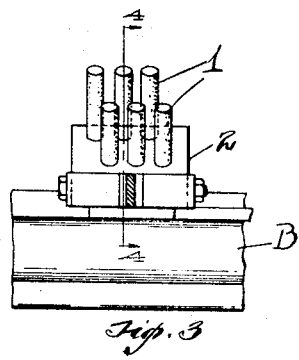
Figure 4:
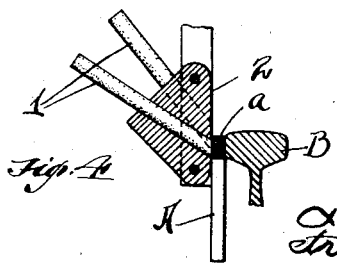

In said annexed drawing:—Figure 1 is a perspective view, partly in the nature of a diagram of one form of apparatus adapted for the carrying out of my improved process; while Figs. 2, 3 and 4 illustrate in side elevation, plan view, and cross section respectively, the improved electrode which forms a part of said apparatus.

In carrying out the present process or method, as above indicated, I make use of an electrode consisting of a plurality of elements suitably insulated from each other, as for example, carbon rods mounted in a suitable holder of non-conducting material. The inner ends of such rods are approximately disposed in the same plane and adapted to contact either with the article to be heated or with an interposed plate of carbon or equivalent material, which in turn contacts with such article, for example with the bond terminal in the case of the specific application of the process under consideration. A current commutating device, of which only one illustrative form is shown, is then utilized to supply the current in succession to certain of the carbons of the electrode, corresponding carbons, paired with those first-named, being connected with the return circuit, as indicated in Fig. 1. As indicated in this same figure, a suitable regulating resistance may be interposed in the circuit, or the current may be varied directly, by regulating the generator which supplies such circuit.

It will be understood that by means of the commutating device the connections with the individual carbons of the electrode are made and broken with sufficient rapidity to avoid the formation of any harmful arc between the same and the article being heated, while the successive impulses of current will, nevertheless, be sufficient to raise such carbons, or electrode elements, at their points of contact with such article to a proper temperature to effect the desired welding operation.

Referring to the construction of the electrode illustrated in Figs. 2, 3 and 4, such electrode will be seen to comprise six separate rods 1 of carbon of like material held in a block 2 of vitrified fire clay, or other non-conducting material, the carbons preferably projecting without said block to the rear and lying substantially flush with its inner face, that is the face which is designed to be brought against the terminal $a$ of the bond A. A plate of carbon may be interposed between such inner ends of the carbon rods, or not, as desired, it being deemed unnecessary to illustrate this arrangement. By means of suitable clamps 3, electric conductors or leads 4 are attached to the respective outer ends of the carbon rods, the other ends of three such leads being directly connected with the main conductor 5 on one side of the generator, while the other end of each of the remaining leads is connected with a corresponding segment 6 of a distributing commutator 7. A rotatable brush 8 is arranged for contact with these commutator segments in succession, said brush being in direct electrical connection with the other side of the generator 9, or equivalent source of current, save for the interposed regulating resistance 10, above referred to. The rotation of the commutator brush may be produced in any suitable fashion, the rate of its rotation being varied to suit the character of the current, and the number of separate contacts, or electrode elements. It will of course be understood that the number of the latter may be considerably larger than in the electrode illustrated in Figs. 2, 3, and 4, where there are but six separate rods, or in other words three pairs through which the current is, in effect, successively passed in series, the bond terminal or equivalent body, that is to be welded, bridging their ends.

By means of the foregoing construction the application of energy to each pair of electrodes continues obviously only for a short interval. The current, being used at a number of adjacent heating points, is so commutated as to form a cycle of intermittent applications of high temperature impulses, all acting on the heating surface and so adapted for welding together homogeneously the two metal bodies.

It will be understood that while, as stated above, the rail B is not used for the return circuit, a portion of the current passing from one electrode element to its companion may pass, not only through the body $a$ with which such elements are in immediate contact, but also in part through the rail. This current, however, cannot be said to pass along the rail, but only through that portion immediately back of the terminals. While it is upon the heat generated at the points of contact of the electrode elements with the first body that dependence is principally placed for securing the welding effect, the current thus passing through the first body and the second body, obviously will, to the extent that these interpose a resistance in its path, assist in securing such effect.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of homogeneously uniting metal bodies, which consists in holding said bodies in contact at the desired point of union; and directly heating one of said bodies by pressing against the same an electrode composed of a plurality of electrically separated resistance elements, and thereupon passing an electric current in recurring cycles successively through different pairs of said resistance elements and said first body arranged in series, whereby said first body and the contacting face of the second body are brought to a welding temperature.

2. The method of homogeneously uniting metal bodies having unlike characteristics as to fusibility, the more readily fusible body having also the greater heat conductivity, which consists in holding said bodies in contact at the desired point of union; and directly heating the first or more readily fusible body by pressing against the same an electrode composed of a plurality of electrically separated resistance elements, and thereupon passing an electric current in recurring cycles successively through different pairs of said resistance elements and said first body arranged in series, whereby said first body and the contacting face of the second body are brought to a welding temperature.

3. The method of homogeneously uniting metal bodies of unlike masses and different temperatures of fusion, the smaller body having both the lower temperature of fusion and greater heat conductivity, which consists in holding said bodies in contact at the desired point of union; and directly heating one of said bodies by pressing against the same an electrode composed of a plurality of electrically separated resistance elements, and thereupon passing an electric current in recurring cycles successively through different pairs of said resistance elements and said first body arranged in series, whereby said first body and the contacting face of the second body are brought to a welding temperature.

4. The method of homogeneously uniting a bond to a rail, which consists in holding the bond in contact with the rail at the desired point of union; directly heating said bond by pressing against the same an electrode composed of a plurality of electrically separated resistance elements, and thereupon passing an electric current in recurring cycles successively through different pairs of said resistance elements and said bond arranged in series, whereby said bond and the contacting face of the rail are brought to a welding temperature.

5. In apparatus of the character described, the combination of a source of current, a composite electrode made up of a plurality of electrically separated resistance elements, and means adapted to connect successive pairs of said elements in series with said source of current.

6. In apparatus of the character described, the combination of a source of current, a composite electrode made up of a plurality of electrically separated resistance elements, and means adapted to connect pairs of said elements in rapid succession in series with said sources of current.

Signed by me, this 14th day of June 1915.

FRANK H. NEFF.

Attested by—
WM. E. HUBER,
CHARLES A. CADWELL.

Copies of this patent may be obtained for five cents each, by addressing the "Commissioner of Patents, Washington, D. C."